(12) United States Patent
Nelson (10) Patent No.: US 9,535,314 B2
(45) Date of Patent: Jan. 3, 2017

(54) AUTO STEREOSCOPIC PROJECTOR SCREEN

(71) Applicant: Jeremy Richard Nelson, Upper Black Eddy, PA (US)

(72) Inventor: Jeremy Richard Nelson, Upper Black Eddy, PA (US)

( * ) Notice: Subject to any disclaimer, the term of this patent is extended or adjusted under 35 U.S.C. 154(b) by 0 days.

(21) Appl. No.: 14/810,483

(22) Filed: Jul. 28, 2015

(65) Prior Publication Data

US 2015/0331249 A1    Nov. 19, 2015

Related U.S. Application Data

(63) Continuation of application No. 14/133,707, filed on Dec. 19, 2013.

(Continued)

(51) Int. Cl.
*G03B 21/602* (2014.01)
*G03B 21/606* (2014.01)
(Continued)

(52) U.S. Cl.
CPC ......... *G03B 21/602* (2013.01); *G02B 27/0093* (2013.01); *G02B 27/225* (2013.01); *G02B 27/2214* (2013.01); *G02B 27/26* (2013.01); *G03B 21/56* (2013.01); *G03B 21/604* (2013.01); *G03B 21/606* (2013.01); *H04N 9/31* (2013.01); *H04N 13/0402* (2013.01); *H04N 13/0404* (2013.01); *H04N 13/0425* (2013.01); *H04N 13/0459* (2013.01)

(58) Field of Classification Search
CPC ..... G03B 21/56; G03B 21/602; G03B 21/604; G03B 21/606; G02B 27/2214
USPC .................................................. 359/458–459
See application file for complete search history.

(56) References Cited

U.S. PATENT DOCUMENTS 4,732,441 A * 3/1988 Cheng .................. G03B 21/602
                                                         359/451
6,600,600 B2 * 7/2003 Chen ...................... G03B 21/60
                                                         353/79

(Continued)

*Primary Examiner* — Christopher Mahoney (57) ABSTRACT

A projector system using a screen comprised of either a plurality of miniature, reflective, and concave or convex curved surfaces that are arranged in a pattern to create a screen surface for front projection, or a plurality of miniature, transparent, and curved convex or concave lenses that are arranged in a pattern to create a screen surface for rear projection, and a projector system with the pixel capacity to control the color and brightness focused onto many different subsections of each curved surface. Each curved lens or curved mirror surface is small enough so that when viewed from the viewing area, the lit and unlit areas seen within each individual curved surface blend together so that only the average brightness and color of each curved surface can be seen by a viewer. By controlling the subsections of each curved surface with focused light from a high resolution projector, the system can control the image the viewer sees in their left eye separately from their right eye and the viewer can see stereographic images without the need to wear filtering glasses. With inclusion of an external head tracking system, the left/right images for each subsection can be switched as needed when one or multiple viewers move their head or seating position within the viewing area.

20 Claims, 9 Drawing Sheets

Related U.S. Application Data

(60) Provisional application No. 61/759,409, filed on Feb. 1, 2013.

(51) Int. Cl.
*G03B 21/56* (2006.01)
*G03B 21/604* (2014.01)
*G02B 27/26* (2006.01)
*H04N 13/04* (2006.01)
*H04N 9/31* (2006.01)
*G02B 27/00* (2006.01)
*G02B 27/22* (2006.01)

(56) References Cited

U.S. PATENT DOCUMENTS

| | | | | |
|---|---|---|---|---|
| 7,019,900 | B2 * | 3/2006 | Benning | G02F 1/135 345/87 |
| 7,342,721 | B2 * | 3/2008 | Lukyanitsa | G02B 27/2214 345/6 |
| 7,843,449 | B2 * | 11/2010 | Krah | H04N 13/0402 345/419 |
| 2006/0017887 | A1 * | 1/2006 | Jacobson | G03B 21/10 353/30 |
| 2006/0103928 | A1 * | 5/2006 | Moriya | G03B 21/604 359/449 |
| 2006/0181769 | A1 * | 8/2006 | Kumasawa | G03B 21/604 359/449 |
| 2008/0297895 | A1 * | 12/2008 | Fujita | G03B 21/60 359/459 |
| 2011/0194178 | A1 * | 8/2011 | Katsuma | G03B 21/602 359/459 |

* cited by examiner

FIG. 20

AUTO STEREOSCOPIC PROJECTOR SCREEN

CROSS-REFERENCE TO RELATED APPLICATION

This application claims the benefit of U.S. Nonprovisional application Ser. No. 14/133,707. U.S. Ser. No. 14/133,707 claims the benefit of Provisional Application No. 61/759,409, filed Feb. 1, 2013.

BACKGROUND OF THE INVENTION

The Present invention relates to front projector and rear projector screens and high resolution projectors that together allow for large-screen stereographic viewing.

Viewing of large screen stereographic imagery generated from a front or rear projector source has been accomplished previously by employing different filtering techniques in order to separate the left eye's image from the right eye's image. Active shutter glasses have been used with polarized projector sources along with timed flashes on screen to separate the images for the left and right eye. Other methods include dual passive projection, anaglyph 3D, and separation of color spectrum. All of these methods require the viewer to wear glasses to view a large-screen projected image in stereo.

SUMMARY OF THE INVENTION

The present invention allows multiple viewers to perceive a stereo image from a flat or curved front or rear projection screen without the need for glasses and without requiring a fixed position within the designed viewing area. This is accomplished by use of a screen comprised of either a plurality of miniature reflective curved surfaces, or a plurality of curved and transparent lenses stacked in an array to make a screen. Working with this screen is a projector with a pixel resolution capable of controlling the light focused onto many subsections of each curved surface or curved lens. The invention works and relies on several critical elements. Because the screen is made of either totally reflective curved surfaces, or totally transparent lenses, there is no diffusion, so in a darkened room with a projector on the only bright section on each curved surface would be a miniature reflection of the projector's objective lens. Because of the curvature of the lens or reflective surface, this miniature objective lens image will appear to move across the surface of each curved surface as a viewer moves their eye position within the designed viewing area. If they are close enough to the screen, the distance between their eyes is great enough that the objective lens image seen by each eye is located on a spatially separated position on each curve when looked at through one eye compared to the other, and the same is true for every curved lens or curved reflective surface making the screen. By focusing different pixel information on these physically different spaces on each curve, the perceived color and brightness of each curved lens or curved reflective surface of the screen can be different for every eye for every viewer of the screen. Furthermore, despite the screen image seen by each eye being comprised entirely of controlled objective lens images, because each curved lens or curved reflective surface is as small or smaller than the smallest detail a human being can resolve from the viewing distance, the lit section of each curve seen by a viewer would average and blend with the unlit sections, so that no gaps or images of objective lenses will be seen, and instead only regular screen images.

To lower the manufacturing requirements, several methods of lowering the pixel requirements for the present invention are described as alternative embodiments. An embodiment of the invention which uses a screen comprised of a plurality of curved transparent lenses instead of a plurality of curved reflective surfaces to allow for rear-projection will also be described as an alternative embodiment.

DETAILED DESCRIPTION OF THE INVENTION

Figure 1:
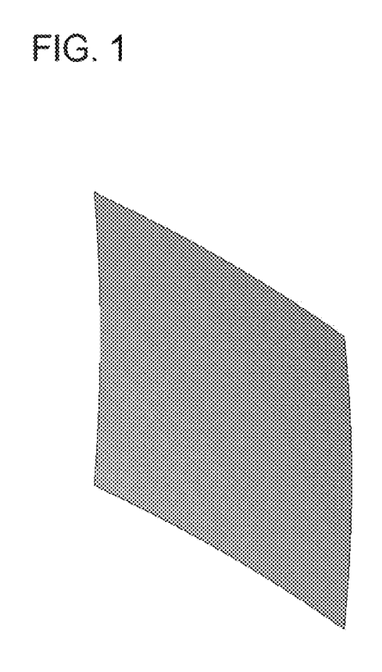
FIG. 1 shows a magnified isometric view of one of the plurality of squared reflective shapes that make an embodiment of screen of the invention.

FIG. 1 shows an isometric view of one of the plurality of squared reflective shapes that when rotated and arranged in a pattern, can make an embodiment of the screen of the present invention. It has a smooth concave curved surface of high reflectivity, and will be referred to from this point forward as a concave facet. Convex reflective curves could also be used for a screen of the present invention however using convex surfaces will cause some significant incoming projector light to the screen to be blocked if making a flat projection screen. Each concave facet is designed to receive focused light from a projector, and redirect that light towards the desired viewing area. Each is square-shaped to reflect the most typically needed viewing area, but other shapes such as triangular, rectangular, hexagonal or others can be used for different seating requirements and different screen shapes. The focal point for each concave facet determines the size of the resultant viewing angle for that concave facet. The concave facet in FIG. 1 has a focal distance of 0.278 cm, as will all the concave facets described in this embodiment of the invention, but other focal distances can be used. It has a size of 0.106×0.106 centimeters, and if it was any larger than this then gaps would appear in the image when viewed by a viewer of average visual acuity, when seen from the designed viewing area distance of 365.76 cm. The size of the concave facets must be as small or smaller than the smallest detail that a viewer could resolve from the viewing area when viewing the screen. The average acuity of the human eye can vary, as can the viewer's distance to the screen, so slightly smaller or larger curved facets could be substituted. Each concave facet for this front projection embodiment of the invention must be reflective so materials that could be used for manufacture might be but are not limited to silver, aluminum, or glass coated with reflective surfaces.

Figure 2:
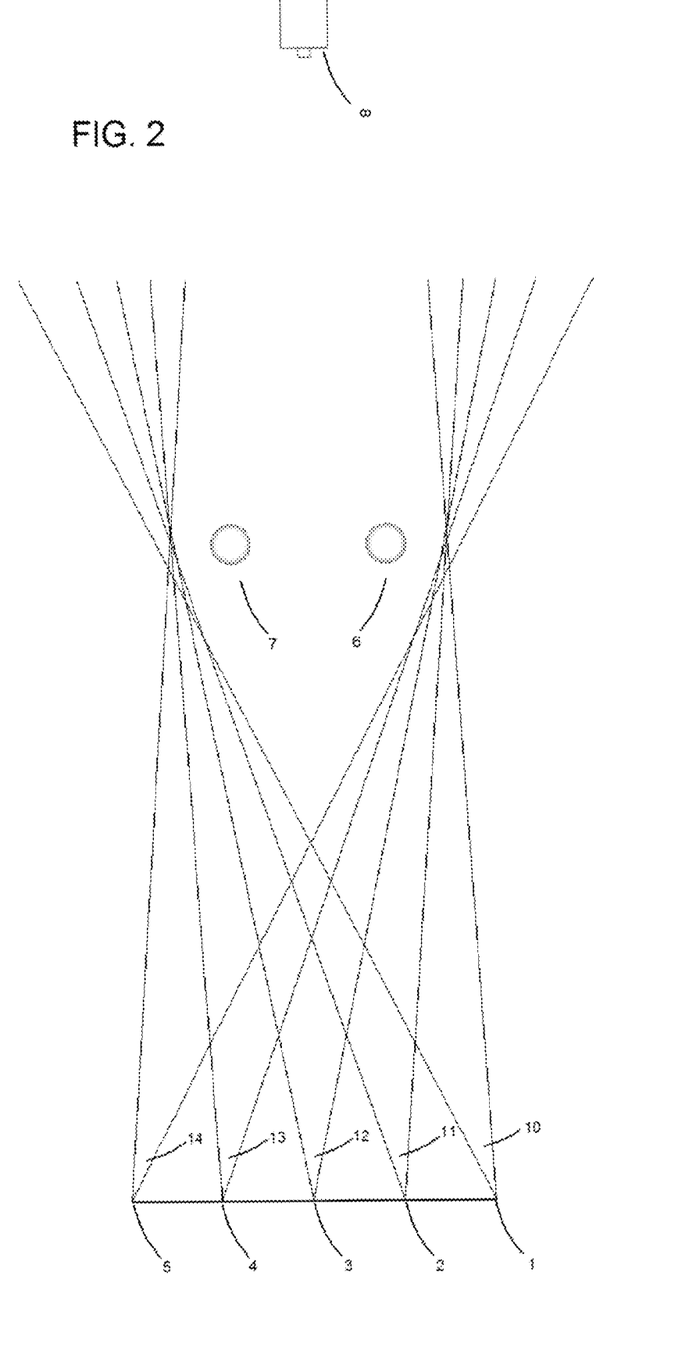
FIG. 2 shows a top down view of an embodiment of the screen of the present invention with the positions of five horizontally rotated concave facets labeled and with lines representing the light reflected off of the highlighted concave facets.
Figure 3:
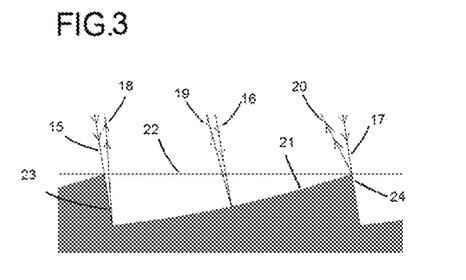
FIG. 3 shows a magnified top-down view of one of the concave facets, the position of which is labeled as 1 in FIG. 2
Figure 4:
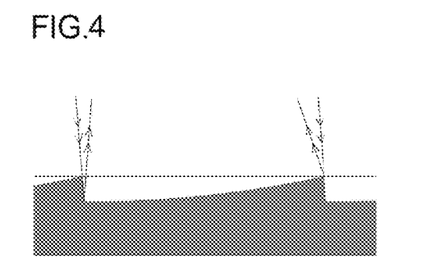
FIG. 4 shows a magnified top-down view of one of the concave facets, the position of which is labeled as 2 in FIG. 2
Figure 5:
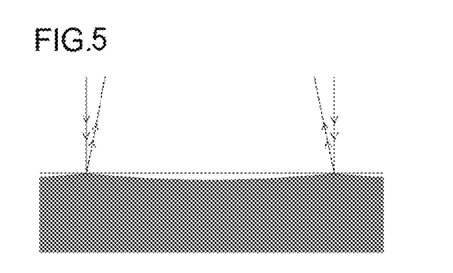
FIG. 5 shows a magnified top-down view of one of the concave facets, the position of which is labeled as 3 in FIG. 2
Figure 6:
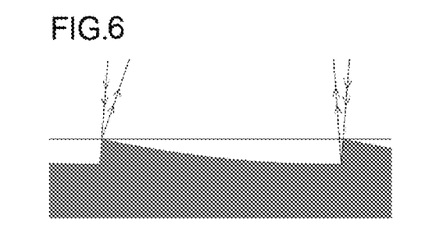
FIG. 6 shows a magnified top-down view of one of the concave facets, the position of which is labeled as 4 in FIG. 2
Figure 7:
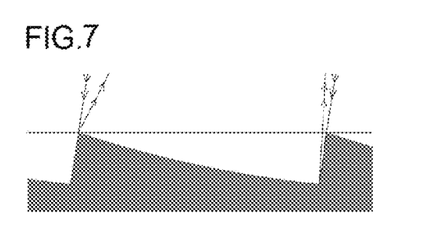
FIG. 7 shows a magnified top-down view of one of the concave facets, the position of which is labeled as 5 in FIG. 2

FIG. 2 shows a top down view of an embodiment of the screen of the present invention. The screen has dimensions of 203.2×114.3 centimeters. The screen is made of a grid of 1920×1080 square-shaped reflective concave facets each a size of 0.106×0.106 centimeters. The viewers of this screen are the circles 6 and 7 and they are a distance of 365.76 centimeters from the screen. The projector shining focused light on each concave facet is 8. Five concave facets from the center horizontal row have been selected from this screen and labeled 1, 2, 3, 4, and 5, and each has a separate magnified top-down view showing the concave facet, and a small section of its adjacent concave facets at this position. Concave facet 1 is shown in FIG. 3, and 10 is the viewing angle for 1. 2 is shown in FIG. 4, and 11 is the viewing angle for 2. 3 is shown in FIG. 5, and 12 is the viewing angle for 3. 4 is shown in FIG. 6, and 13 is the viewing angle for 4. 5 is shown in FIG. 7, and 14 is the viewing angle for 5. The viewing area for each concave facet is expanding and overlapping, and the area where all concave facets overlap is the designed stereoscopic viewing area.

When focused projector light from projector 8 hits concave facet 1, the light will enter as shown in FIG. 3 at points 15, 16, and 17, will be reflected by the reflective concave curve 21, and exit as represented by points 18, 19, and 20. The reflected light will continue past its focal point. Once past its focal point, it will begin to expand and continue to expand as can be seen back in FIG. 2 at point 10. Continuing with FIG. 2, 10 is the horizontal viewing area for 1. For viewers 6 and 7 within the viewing area for 1, the image seen on 1 will be of a real, diminished image of the objective lens for projector 8. The image of the objective lens seen will be positioned somewhere on the curve depending on the viewer's position within the viewing area and it is in this area of the curve that light from 8 is shining directly into the viewer's eye.

Concave facet 1 has been rotated horizontally 12.1 degrees counterclockwise from a top-down view. Concave facet 5 is identical to 1, except it has been rotated clockwise 12.1 degrees. Concave facet 2 has been rotated horizontally 6.05 degrees counterclockwise, and concave facet 4 6.05 degrees clockwise. Center concave facet 3 has not been horizontally rotated. Except for center concave facet 3, all concave facets making up this described embodiment of the invention have been rotated horizontally so that their reflected light is redirected to the center of the viewing area, and expanded. Due to this, viewers 6 and 7 are able to see one visibly lit section within each eye for each concave facet. Furthermore, due to the size of each concave facet being as small as the human eye is able to resolve, the visible and non-visible sections of each facet will blend together when viewed from the viewing area, so that the viewer does not see any gaps or areas of the screen that are unlit and instead only sees a solid screen in each eye.

Returning to FIG. 3, you can see edges at 23 and 24. These edges were created due to moving the concave facets behind line 22 which represents where a flat screen line would be. All the concave facets have been positioned to not extend farther than 22 because flat screen surfaces are traditionally preferred; however curved screen types could be made with the present invention that would not create the edges that are a consequence of making the screen flat. No useful light will be visible to the viewer in edges 24 and 23, and because of this it is beneficial to blacken the edges with flat black paint or by printing a diffusion pattern on its surface to preserve contrast by reducing the limited light that hits it as 15 and 17 continue to expand after hitting the beginning of edge 23. Edges 23 and 24 are aligned to be run parallel with the light from the projector 15 and 17 so that the edges block as little incoming light as possible.

Figure 8:
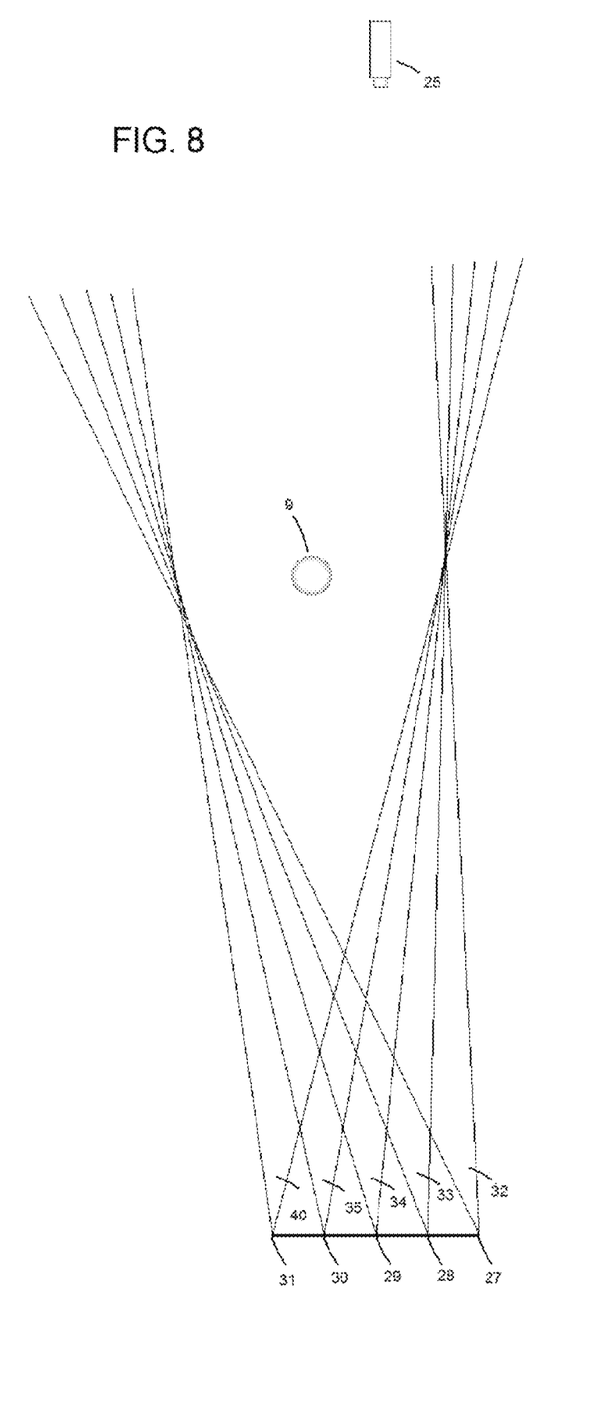
FIG. 8, which shows a left side view of an embodiment of the invention and is the same embodiment as described in FIG. 2

Turning now to FIG. 8, which shows a left side view of an embodiment of the invention and is the same embodiment as described in FIG. 2. 9 represents two viewers who are vertically on the same level, and therefore circle 9 represents the same viewers as described in FIG. 2. The projector shining focused light on each curved facet is 25.

Figure 9:
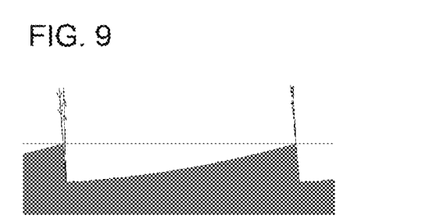
FIG. 9 shows a magnified left-side view of one of the concave facets, the position of which is labeled as 27 in FIG. 8
Figure 10:
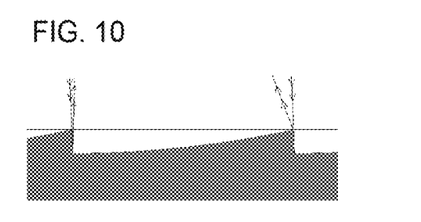
FIG. 10 shows a magnified left-side view of one of the concave facets, the position of which is labeled as 28 in FIG. 8
Figure 11:
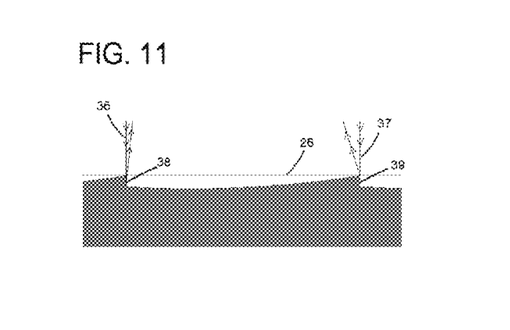
FIG. 11 shows a magnified left-side view of one of the concave facets, the position of which is labeled as 29 in FIG. 8
Figure 12:
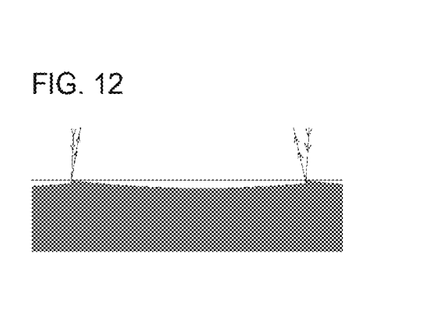
FIG. 12 shows a magnified left-side view of one of the concave facets, the position of which is labeled as 30 in FIG. 8
Figure 13:
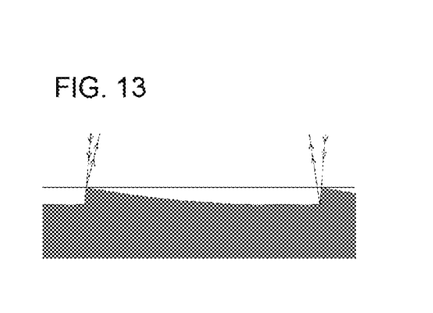
FIG. 13 shows a magnified left-side view of one of the concave facets, the position of which is labeled as 31 in FIG. 8

Five concave facets from the center vertical column have been selected from this screen and labeled 27, 28, 29, 30, 31 and each has a separate magnified top-down view showing the concave facet, and a small section of its adjacent concave facets at this position. Concave facet 27 is shown in FIG. 9, and 32 is the viewing angle for 27. 28 is shown in FIG. 10, and 33 is the viewing angle for 28. 29 is shown in FIG. 11, and 34 is the viewing angle for 28. 30 is shown in FIG. 12, and 35 is the viewing angle for 30. 31 is shown in FIG. 13, and 40 is the viewing angle for 31. The viewing area for each concave facet is expanding and overlapping, and the area where all concave facets overlap is the stereoscopic viewing area for 9.

In FIG. 9, FIG. 10, FIG. 11, FIG. 12, and FIG. 13, you can see how the concave reflective facets have been vertically rotated to redirect their reflected light towards the viewing area. One difference compared from the horizontal rotation is that the center concave facet shown in FIG. 10 has been vertically rotated 2.7 degrees counterclockwise from a left-side perspective whereas that same concave facet does not get horizontally rotated as is shown FIG. 5. This is because the viewer's heads are typically located below the beam of projection from a projector so as not to cast shadows on the projected light. The center curved facet 29 as shown in FIG. 11 in this embodiment of the invention will need to start with a vertical rotation 2.7 degrees counterclockwise from a left-side view so that the focused projector light reflecting off it is redirected towards the viewing area, and expanded. Similarly concave facets 27, 28, 30, 31, and all concave facets in this embodiment of the invention have been vertically rotated so that their reflected beams are redirected towards the center of the viewing area and expanded. Just as with the horizontal rotation, moving each curved facet behind screen line 26 as shown in FIG. 11 creates an edge for each rotated concave facet which becomes more prominent as the concave facets get farther from the center of the screen. The edges for concave facet 29 as shown in FIG. 11 are 38 and 39. They are aligned to be run parallel with the incoming projector light represented by lines 36 and 37 to block as little light as possible. These edges are present due to moving the vertically rotated concave facets behind the screen line. If the present invention were used in a curved screen embodiment, edges can be minimized.

Figure 14:
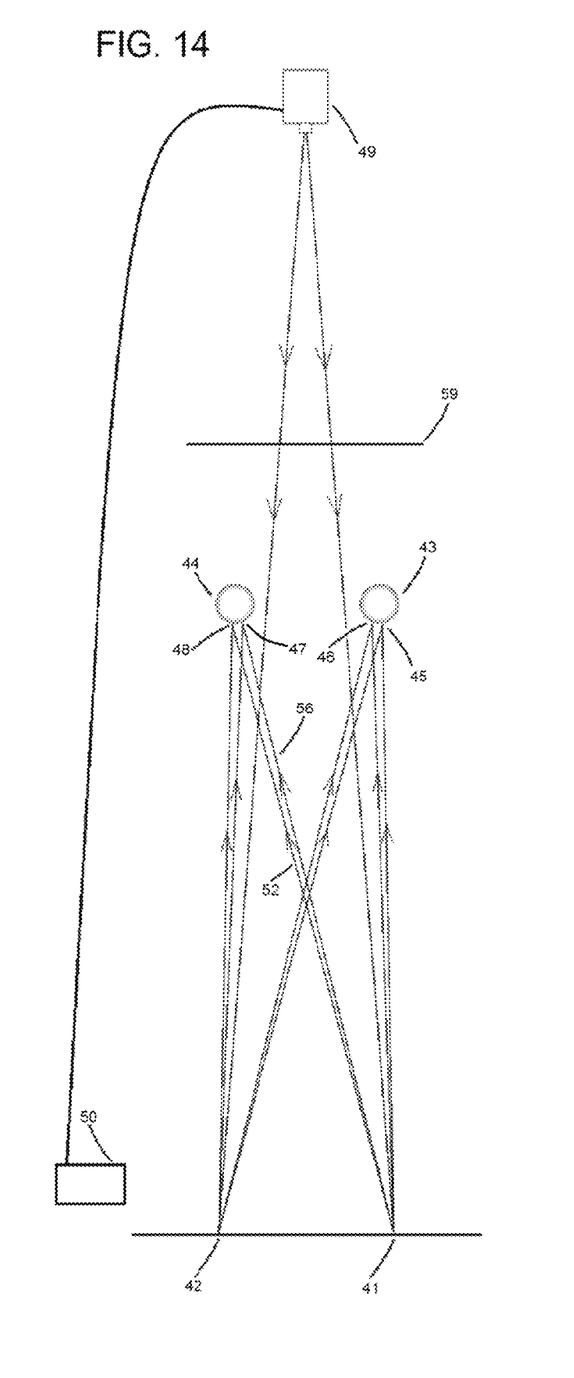
FIG. 14 shows another top down view of an embodiment of the screen of the present invention, and it is the same embodiment as shown in FIG. 2 and FIG. 8.

FIG. 14 shows another top down view of an embodiment of the screen of the present invention, and it is the same embodiment as shown in FIG. 2 and FIG. 8. The viewers are the circles 43 and 44. The left eye position for 43 is shown at 45 and that same viewer's right eye is at 46. The left eye for 44 is at 47 and this same viewer's right eye is at 48. The projector labeled 49 has a screen resolution of 92160×51840. 50 is an external motion tracking system and computer which is recording positional data about 43 and 44 and sending it to projector 49.

Figure 15:
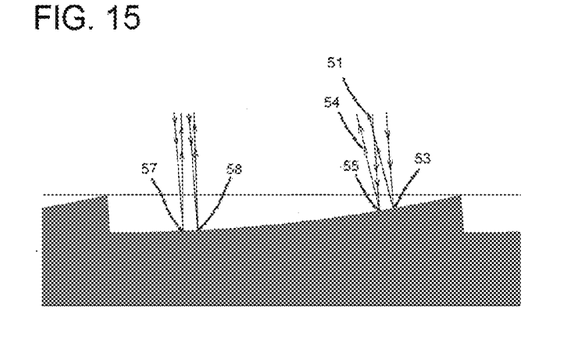
FIG. 15 shows a magnified top-down view of one of the concave facets, the position of which is labeled as 41 in FIG. 14
Figure 16:
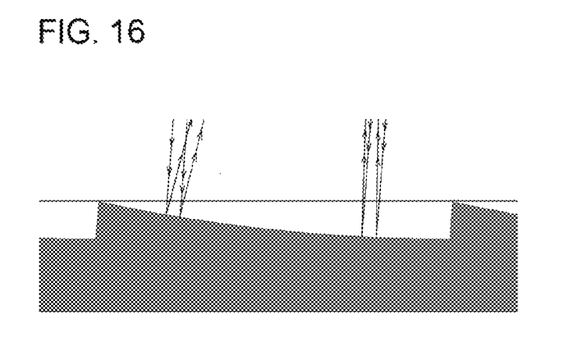
FIG. 16 shows a magnified top-down view of one of the concave facets, the position of which is labeled as 42 in FIG. 14

Two concave facets from the center horizontal row of the screen have been magnified and shown in their own view. Concave facet 41 is shown in FIG. 15. Concave facet 42 is shown in FIG. 16. In FIG. 15 line 51 shows the travel path for the light that has been reflected off of concave curved surface at position 53. Line 51 in FIG. 15 is the same as line 52 in FIG. 14, and can be seen in FIG. 14 ultimately ending its travel directly in the right eye 48 for viewer 44.

Returning to FIG. 15, at the position where Line 51 was reflected 53, there will appear at that position, for the right eye 48 for viewer 44, an inverted, real, and diminished reflected image of the objective lens of projector 49. Moreover, because the light available to position 53 in from projector 49 is focused projector light, the color and brightness of the reflected image of the objective lens as seen by 44 in 48 will be determined by the color and brightness of the pixel information focused onto that position of the reflective concave surface 53 by 49. To illustrate, if the pixel focused onto 53 by 49 was a red pixel, then the image of the objective lens would be seen as red in color in the left eye of viewer 44 in FIG. 14.

In FIG. 15 line 54 shows the travel path for the light that has been reflected off of concave curved surface at position 55. Line 54 in FIG. 15 is the same as line 56 in FIG. 14, and can be seen in FIG. 14 ultimately ending its travel directly in the left eye 47 for viewer 44.

Returning to FIG. 15, at the position where Line 54 was reflected 55, there will appear at that position, for the left eye 47 for viewer 44, to be an inverted, real, and diminished reflected image of the objective lens of projector 49. Moreover, because the light available to position 55 from 49 is focused projector light, the color and brightness of the image of the objective lens seen by 44 in 47 will be determined by the color and brightness of the focused pixel information at that position of the reflective concave surface 55. To illustrate, if the pixel focused onto 55 was a green pixel, then the image of the objective lens would be seen as green in color in the left eye of viewer 44 in FIG. 14.

Projector 49 in FIG. 14 has a pixel resolution of 92160×51840, and that is a grid of 48×48 pixels of sub-pixel control for every concave facet. Due to this, the focused pixel information provided to position 53 and 55 in FIG. 15 can be separately controlled. 44's distance to the screen is 365.76 cm, and at that distance the images of the objective lenses as seen by 47 and 48 occur on spatially separate areas on concave facet 41 and therefore since 49 can control the color and brightness of these subsections individually, the pixel information provided by concave facet 41 as seen by viewer 44's left eye 47 can be entirely different from the pixel information provided by 41 as seen in by that same viewer in their right eye 48.

Similarly, returning to FIG. 15, position 58 is where the image of the objective lens will be seen by the right eye for viewer 43 in as shown FIG. 14. Position 57 in FIG. 15 is where the image of the objective lens will be seen by the left eye of viewer 44. By controlling what light is focused onto position 57 and 58 in FIG. 15, projector 49 can present different pixel information for the left eye of viewer 43 at 45, than what is seen by the right eye of viewer 43 at 46.

FIG. 16 shows another concave facet from this embodiment of the screen of the present invention and is the same as concave facet 42 in FIG. 14. This concave facet is the horizontal mirror of concave facet 41 as shown in FIG. 14 and performs identically. It is by the same method that pixel information can be controlled individually for every viewer's eye, for every concave facet of this embodiment of the invention. Each concave facet is small enough so that when viewed from the viewing area the lit and unlit sections reflected from each individual concave facet blends together and disappears leaving only a different screen image as seen by each eye viewing the screen.

50 uses a sensor system to track the eye positions for 44 and 43, so that as they move within the viewing area 49 will know what sections of what concave facets effect which viewer's eye, and adjusts so that the correct view is always in the correct eye.

In FIG. 14 line 59 denotes the area beyond which stereo-crosstalk begins be become noticeable in this embodiment of the invention. This distance depends on several factors including the size of the objective lens, distance of objective lens, individual pupillary distance and the configured viewing angles of the screen. More than two users can be supported by the system so long as they are within the designed viewing area and they are not so far from the screen that the reflected objective lens images that the viewer sees in each eye are no longer spatially separated or are overlapping on each curved facet as takes place when a viewer passes beyond 59.

To lower the pixel requirements of the screen of the present invention, a projector capable of 92160×1080 resolution can also provide large-screen stereoscopic viewing for multiple viewers. One downside to this approach though is that since the vertical resolution has been lowered, viewers would not be able to perceive stereographic imagery if they are lying down or predominantly sideways.

Figures 17, 18:
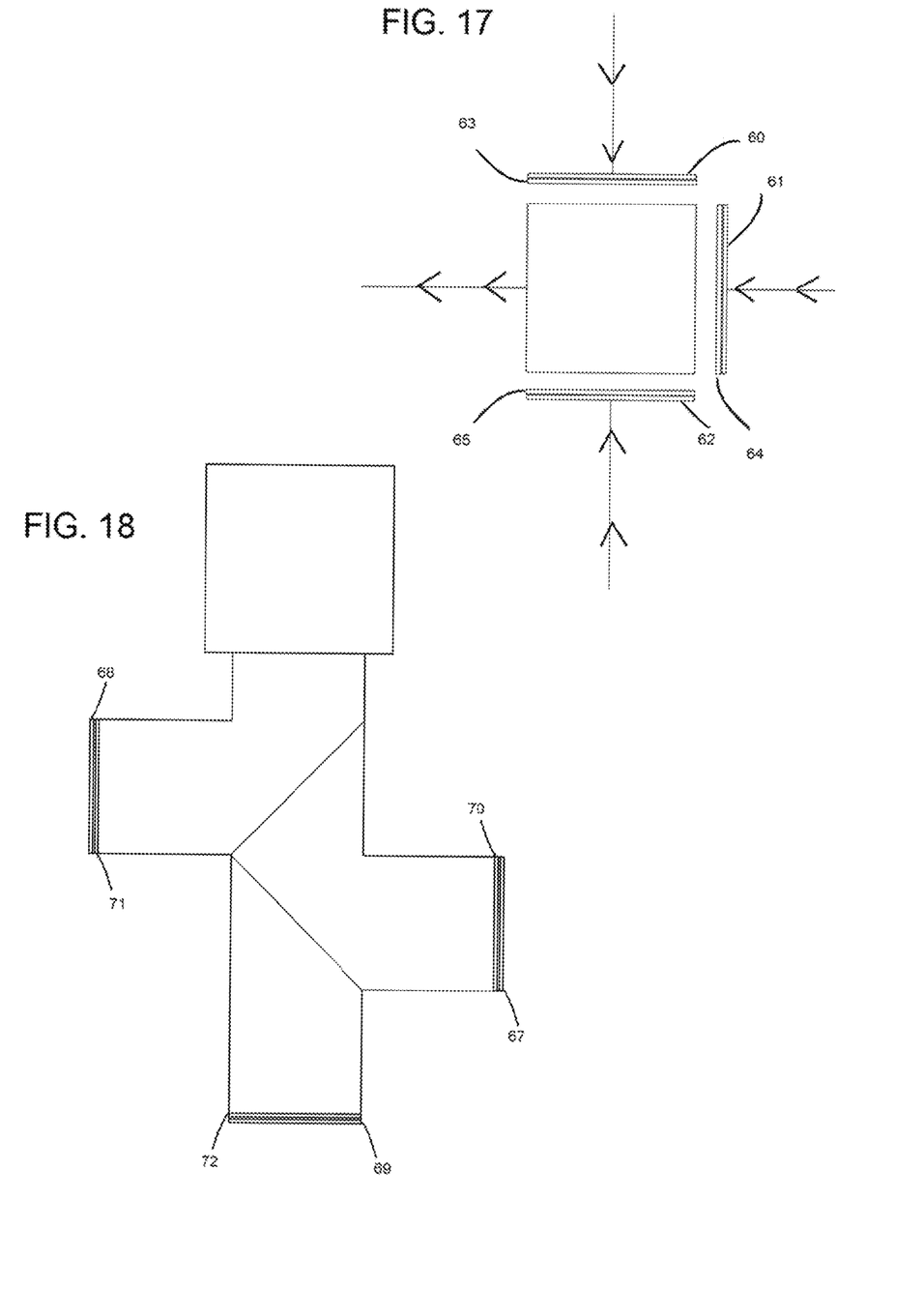
FIG. 17 shows an alternative embodiment of a 3 LCD projector that is modified to work with electronically controlled polarization filters in order to provide multiple-viewers stereo imagery with lower pixel requirements.
FIG. 18 shows an alternative embodiment of a 3 chip DLP projector that is modified to work with electronically controlled polarization filters in order to provide multiple-viewers stereo imagery with lower pixel requirements.

If further lowering of the pixel requirements is required, the property of polarization can be used to control stereoscopic views and can be incorporated into conventional projector designs such as 3 panel LCD or 3 CHIP DLP. FIG. 17 shows an example of the typical design for a 3 LCD panel projection. The arrows on the lines show the direction of light movement through the system. 60, 61, and 62 are the color LCD imagers and each is capable of 120 hz refresh rate and each has a resolution of 1920×1080. 63, 64, and 65 are monochrome LCDs and will be referred to from this point forward as electronically controlled polarization filters. 63, 64, and 65 each have a resolution of 92160×1. Each panel is comprised of only one horizontal row of pixels, however this row has been vertically elongated to match the vertical size of the imager it is placed by.

LCD panels 60, 61, and 62 are outputting two 1920×1080 60 hz images every second by rapidly switching between the images. Every horizontal pixel of electronic polarizers 63, 64, and 65 is synchronized with the imagers so that it can choose individually which of the 60 hz images to block and which 60 hz image to transmit. As a viewer moves their position in front of the screen of the present invention, the position where their eyes would see the image of the objective lens on each concave facet would change as well. In this alternative embodiment, 60, 61, and 62 would maintain the proper left and right eye images for the viewer as they moved since it can chose by polarization filtering which of the two images to display for every eye of every viewer of the screen so long as they remain upright.

Although this alternative embodiment reduces the pixel requirements for an embodiment of present invention, by limiting it to horizontal filtering, the system cannot compensate for a viewer watching the screen while lying sideways. Additionally, due one of the two images always being blocked by each of the vertically elongated horizontal filters of 63, 64, and 65, the brightness of this alternative embodiment is reduced 50% when viewing stereographic material.

Electronic polarization filters can also be used to employ the same techniques to DLP projectors. FIG. 18 shows a typical design for a 3 chip DLP projector. 67, 68, and 69 are DLP imagers, and 70, 71, and 72 are electronic polarization filters. The incoming light to the DLP images would need to be pre-polarized in order for the electronic polarization filters to function.

An additional embodiment could also be the use of, a flat electronic polarization filter with a resolution of 92160×1 which can be fixed directly onto the screen of the present invention to allow for manufacture of larger sized pixels to do the filtering. The electronic polarization filter in this case would be the same size as the screen of the present invention and would be attached in front of the screen and in the light path of the projector.

For any of the alternative embodiments mentioned that employ electronic polarization filters, If vertically displaced viewers are needed, additional vertical resolution can be added to the electronic polarization filter(s) which can then choose between two images in vertical sections as well.

Another alternative embodiment to reduce the pixel requirements would be to use a projector of lower resolutions such as 1920×1080 with a refresh rate of 120 hz or higher capable of alternating between p-polarized and s-polarized images at least 120 times per second. By doing so, there would be no sub-pixel control of each concave facet and the screen would respond much like a conventional polarization preserving screen. This could then be combined with polarized glasses that the user could wear when viewing the screen to separate the s and p-polarized 1920×1080 images into a perceived 3D image.

Figure 19:
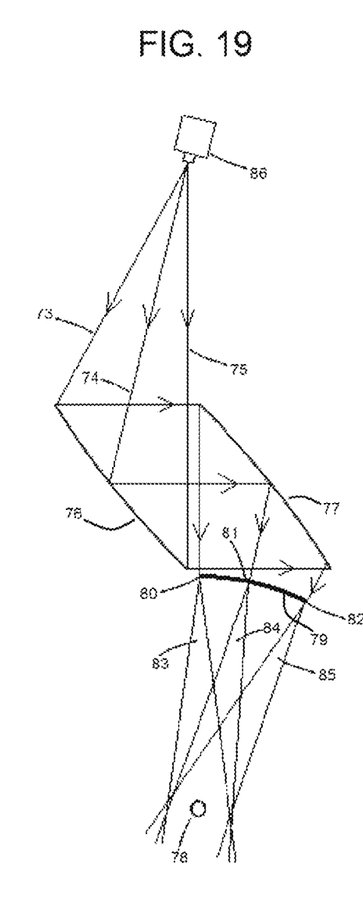
FIG. 19 shows an example of an alternative embodiment of a rear projector system using curved transparent lenses instead of curved reflective surfaces to make a screen of the invention.

FIG. 19 shows a rear projection embodiment of the present invention. It uses the same principles to create large-screen stereo imagery without requiring a viewer to wear filtering glasses, just as the other embodiments do. The alternative embodiments described previously to reduce pixel requires can also apply to a rear projector embodiment.

Figure 20:
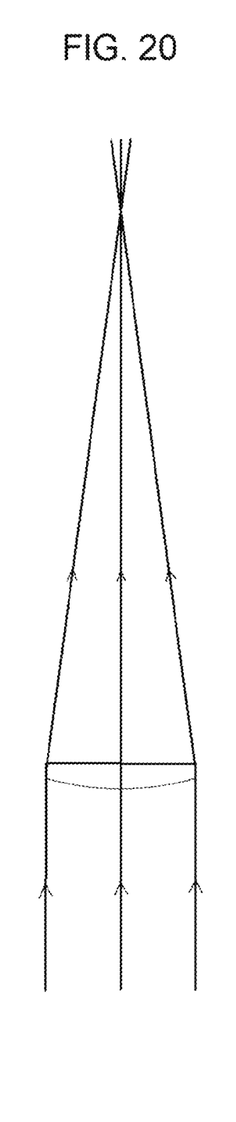
FIG. 20 show a magnified top-down view of the convex lens used to make the embodiment of the screen of the invention as shown in FIG. 19

In this described rear projection embodiment, transparent convex lenses are used instead of concave facets in order to provide independent left and right views for viewers of curved screen 8. Other types of lens curves might also be suitable. Each convex lens has been cut down to a square shape, but other shapes can be used depending on the requirements for viewing area. FIG. 20 shows one of a plurality of convex lenses which together make a screen of this embodiment of the invention. Focus length of the convex lens determines the viewing area for each convex lens as seen by viewers in the viewing area.

Light leaving projector 86 is represented by lines 73, 74, 75, and they have arrows on them to show directional movement. 73, 74, 75 leave projector 86 and expand before reflecting off of parabolic mirror 76. Parabolic mirror 76 culminates the light and it then continues as culminated light before reflecting off of parabolic mirror 77. Parabolic mirror 77 de-culminates projector light by redirecting the light towards the center of the viewing area where the viewer in this embodiment is located represented by circle 78. After reflecting off of parabolic mirror 77, light beams 73, 74, and 75 hit an array of convex lens which make up a curved screen embodiment of the invention 79, and it is here that the light is focused projector light. Each convex lens in this embodiment of the invention is 0.106×0.106 centimeters and employed in this arrangement a convex lens will first focus the light that transmits through it, then as the light travels past the focal point and towards the viewing area it expands and becomes the viewing area for the light transmitted through itself. The viewing areas for the convex lenses at positions 80, 81, and 82, are shown as expanding and overlapping beams 83, 84, and 85. Each viewer's eye would see an image of the projector 86's objective lens in a different position on each convex lens when viewed from the viewing area and because projector 86 has a resolution of 92160×51840, it is able to control the light focused onto 2304 different positions of each convex lens and therefore able to provide independent stereographic views for each viewer of the screen.

The described rear projector embodiment is for a curved section of screen that would fill $\frac{1}{16}^{th}$ of a spherical rear projection screen.

What is claimed is:
1. A stereographic viewing system for at least one user having a right eye and a left eye comprising:
   (a) a reflecting screen including a grid of at least 1920×1080 stationary reflective concave facets, wherein:
      (1) each concave facet has a center of curvature and a size no more than 0.106×0.106 cm;
      (2) a majority of the concave facets are rotated horizontally so that their center of curvature are displaced away from a perimeter of the grid;
      (3) a distal-most point on each of four concave facets located nearest a geometric center of the grid establish an imaginary vertical flat screen plane and no point on any concave facet is located beyond the imaginary vertical flat screen plane;
(b) an electronic polarization filter screen adjacent the reflecting screen, wherein the electronic polarization filter screen has a plurality of horizontal pixels associated with each column of concave facets within the grid;
(c) a projector with a resolution of at least 1920×1080 and a refresh rate of at least 120 Hz projecting a plurality of stereoscopic views through the electronic polarization filter screen onto the reflecting screen;
(d) a sensor system that identifies a location of the user's left eye and right eye; and
(e) wherein the electronic polarization filter screen is synchronized with the projector to control display of the stereoscopic views, and the sensor system controls the horizontal pixels of the electronic polarization filter screen to control the display of a portion of the stereoscopic views on a portion of the concave facets based upon the location of the user's left eye and right eye.

2. The stereographic viewing system of claim 1, wherein a majority of the concave facets are rotated horizontally at least six degrees, and a plurality of the concave facets are rotated horizontally at least twelve degrees.

3. The stereographic viewing system of claim 2, wherein the amount of horizontal rotation of the concave facets increases with their horizontal distance from the geometric center of the grid.

4. The stereographic viewing system of claim 1, wherein a majority of the concave facets are rotated vertically so that their center of curvature are displaced away from a top edge of the perimeter of the grid.

5. The stereographic viewing system of claim 4, wherein a majority of concave facets are rotated vertically at least two degrees so that their center of curvature are displaced away from the top edge of the perimeter of the grid.

6. The stereographic viewing system of claim 1, wherein each concave facet has a focal distance of no more than 0.278 cm, and wherein majority of concave facets have at least one edge surface that is substantially parallel to the angle of incoming light from the projector when located at a design position.

7. The stereographic viewing system of claim 1, wherein the plurality of horizontal pixels associated with each column of concave facets includes at least 48 horizontal pixels for each column of concave facets.

8. The stereographic viewing system of claim 1, the grid comprising rows of concave facets, wherein the electronic polarization filter screen has a plurality of vertical pixels associated with each row of concave facets within the grid, and the sensor system controls the vertical pixels of the electronic polarization filter screen to control the display of a portion of the stereoscopic views on a portion of the concave facets based upon the location of the user's left eye and right eye.

9. The stereographic viewing system of claim 8, wherein the plurality of vertical pixels associated with each row of concave facets includes at least 48 vertical pixels for each row of concave facets.

10. The stereographic viewing system of claim 1, wherein the sensor system continuously identifies the real-time location of the user's left eye and right eye, and controls horizontal pixels of the electronic polarization filter screen based upon the real-time eye location to control the display of a portion of the stereoscopic views on a portion of the concave facets.

11. The stereographic viewing system of claim 1, wherein the sensor system is a multiuser sensor system that also identifies a location of a second user's left eye and right eye, and controls horizontal pixels of the electronic polarization filter screen to control display of a portion of the stereoscopic views on the concave facets based upon (a) the location of the user's left eye and right eye, and (b) the location of the second user's left eye and right eye.

12. A stereographic viewing system for at least one user having a right eye and a left eye comprising:
(a) a reflecting screen including a grid of at least 1920× 1080 stationary reflective concave facets, wherein:
 (1) each concave facet has a center of curvature and a size no more than 0.106×0.106 cm;
 (2) a majority of the concave facets are rotated horizontally so that their center of curvature are displaced away from a perimeter of the grid;
 (3) a distal-most point on each of four concave facets located nearest a geometric center of the grid establish an imaginary vertical flat screen plane and no point on any of concave facets is located beyond the imaginary vertical flat screen plane;
 (4) wherein a majority of the concave facets are rotated horizontally at least six degrees, and a plurality of the concave facets are rotated horizontally at least twelve degrees;
 (5) wherein a majority of the concave facets are rotated vertically so that their center of curvature are displaced away from a top edge of the perimeter of the grid;
(b) an electronic polarization filter screen adjacent the reflecting screen, wherein the electronic polarization filter screen has a plurality of horizontal pixels associated with each column of concave facets within the grid, wherein the plurality of horizontal pixels associated with each column of concave facets includes at least 48 horizontal pixels for each column of concave facets;
(c) a projector with a resolution of at least 1920×1080 and a refresh rate of at least 120 Hz projecting a plurality of stereoscopic views through the electronic polarization filter screen onto the reflecting screen;
(d) a sensor system that continuously identifies a real-time location of the user's left eye and right eye; and
(e) wherein the electronic polarization filter screen is synchronized with the projector to control display of the stereoscopic views, and the sensor system controls the horizontal pixels of the electronic polarization filter screen to control the display of a portion of the stereoscopic views on a portion of the concave facets based upon the real-time location of the user's left eye and right eye.

13. The stereographic viewing system of claim 12, wherein an amount of horizontal rotation of the concave facets increases with their horizontal distance from the geometric center of the grid.

14. The stereographic viewing system of claim 12, wherein a majority of the concave facets are rotated vertically at least two degrees so that their center of curvature are displaced away from the top edge of the perimeter of the grid.

15. The stereographic viewing system of claim 12, wherein each concave facet has a focal distance of no more than 0.278 cm.

16. The stereographic viewing system of claim 12, wherein the electronic polarization filter screen has a plurality of vertical pixels associated with each row of concave facets within the grid, and the sensor system controls the vertical pixels of the electronic polarization filter screen to control the display of a portion of the stereoscopic views on a portion of the concave facets based upon the location of the user's left eye and right eye.

17. The stereographic viewing system of claim 16, wherein the plurality of vertical pixels associated with each row of concave facets includes at least 48 vertical pixels for each row of concave facets.

18. The stereographic viewing system of claim 12, wherein the sensor system is a multiuser sensor system that also identifies a location of a second user's left eye and right eye, and controls the horizontal pixels of the electronic polarization filter screen to control the display of a portion of the stereoscopic views on the concave facets based upon (a) the location of the user's left eye and right eye, and (b) the location of the second user's left eye and right eye.

19. A stereographic viewing system for at least one user having a right eye and a left eye comprising:
  (a) a reflecting screen including a grid of at least 1920× 1080 stationary reflective concave facets, wherein:
    (1) each concave facet has a center of curvature, a size no more than 0.106×0.106 cm, and a focal distance of no more than 0.278 cm;
    (2) a majority of the concave facets are rotated horizontally so that their center of curvature are displaced away from a perimeter of the grid;
    (3) a distal-most point on each of four concave facets located nearest a geometric center of the grid establish an imaginary vertical flat screen plane and no point on any of concave facet is located beyond the imaginary vertical flat screen plane;
    (4) wherein a majority of the concave facets are rotated horizontally at least six degrees, and a plurality of the concave facets are rotated horizontally at least twelve degrees, wherein the amount of horizontal rotation of the concave facets increases with their horizontal distance from the geometric center of the grid;
    (5) wherein a majority of the concave facets are rotated vertically at least two degrees so that their center of curvature are displaced away from a top edge of the perimeter of the grid;
  (b) an electronic polarization filter screen adjacent the reflecting screen, wherein the electronic polarization filter screen has a plurality of horizontal pixels associated with each column of concave facets within the grid, wherein the plurality of horizontal pixels associated with each column of concave facets includes at least 48 horizontal pixels for each column of concave facets;
  (c) a projector with a resolution of at least 1920×1080 and a refresh rate of at least 120 Hz projecting a plurality of stereoscopic views through the electronic polarization filter screen onto the reflecting screen;
  (d) a sensor system that continuously identifies the real-time location of the user's left eye and right eye;
  (e) wherein the electronic polarization filter screen is synchronized with the projector to control the display of the stereoscopic views, and the sensor system controls the horizontal pixels of the electronic polarization filter screen to control the display of a portion of the stereoscopic views on a portion of the concave facets based upon the real-time location of the user's left eye and right eye; and
  (f) wherein a majority of the concave facets have at least one edge surface that is substantially parallel to the angle of the incoming light from the projector when located at a design position.

20. The stereographic viewing system of claim 19, wherein the sensor system is a multiuser sensor system that also identifies a location of a second user's left eye and right eye, and
  controls the horizontal pixels of the electronic polarization filter screen to control display of a portion of stereoscopic views on the concave facets based upon (a) the location of the user's left eye and right eye, and (b) the location of the second user's left eye and right eye.

* * * * *